(12) United States Patent
Garrec

(10) Patent No.: US 7,073,406 B2
(45) Date of Patent: Jul. 11, 2006

(54) SCREW AND NUT TRANSMISSION AND CABLE ATTACHED TO THE SCREW

(75) Inventor: Philippe Garrec, Gif-sur Yvette (FR)

(73) Assignee: Commissariat a L'Energie, Paris (FR)

( * ) Notice: Subject to any disclaimer, the term of this patent is extended or adjusted under 35 U.S.C. 154(b) by 10 days.

(21) Appl. No.: 10/296,740

(22) PCT Filed: May 25, 2001

(86) PCT No.: PCT/FR01/01630

§ 371 (c)(1),
(2), (4) Date: Nov. 26, 2002

(87) PCT Pub. No.: WO01/92761

PCT Pub. Date: Dec. 6, 2001

(65) Prior Publication Data

US 2003/0074990 A1    Apr. 24, 2003

(30) Foreign Application Priority Data

May 26, 2000  (FR) .................................. 00 06757

(51) Int. Cl.
*F16H 27/02* (2006.01)
(52) U.S. Cl. ..................... 74/89.34; 74/89.36
(58) Field of Classification Search ............... 74/89.23, 74/89.34, 89.36, 89.37, 424.71, 424.7
See application file for complete search history.

(56) References Cited

U.S. PATENT DOCUMENTS 2,907,219 A * 10/1959 Orner ............................ 74/58
3,029,659 A * 4/1962 Geyer ........................ 74/409
3,200,664 A * 8/1965 Mauric ...................... 74/89.37
3,731,547 A * 5/1973 Fullbrook ................... 74/89.3
3,841,454 A * 10/1974 Pionte .................... 192/111 R
3,951,004 A * 4/1976 Heesch ...................... 248/394
4,074,463 A * 2/1978 Colanzi ...................... 49/352
4,420,988 A * 12/1983 Deligny ................. 74/501.5 R
4,482,828 A * 11/1984 Vergues et al. ............... 310/83
5,008,996 A * 4/1991 Bonnand et al. .............. 29/727
5,313,852 A * 5/1994 Arena ....................... 74/89.35
5,349,878 A * 9/1994 White et al. ............... 74/89.14
5,398,780 A * 3/1995 Althof et al. .................. 185/39
5,467,957 A * 11/1995 Gauger ...................... 248/429
5,613,400 A * 3/1997 Sato et al. ................. 74/89.36
5,984,068 A * 11/1999 Reed, Jr. ................... 192/84.6
6,053,064 A * 4/2000 Gowing et al. ............ 74/89.45
6,101,889 A * 8/2000 Laskey ....................... 74/89.23
6,337,547 B1 * 1/2002 Jouan de Kervenoael .... 318/15

(Continued)

FOREIGN PATENT DOCUMENTS

FR        2782467        8/1998

(Continued)

OTHER PUBLICATIONS

Copy of ISR—International Search Report.

*Primary Examiner*—David Fenstermacher
(74) *Attorney, Agent, or Firm*—Thelen Reid & Priest LLP

(57) ABSTRACT

A cable or another longilinear transmission component is set into the center of an axial cavity of a screw belonging to a screw and nut movement conversion unit. By means of this arrangement, bending moments exerted on the screw between the point of attachment of the component and the nut have only a small value, which guarantees the screw against bending and sticking and the whole mechanism against excessive friction.

21 Claims, 4 Drawing Sheets

U.S. PATENT DOCUMENTS 6,672,179 B1 * 1/2004 Borgarelli et al. ......... 74/89.36
6,708,577 B1 * 3/2004 Pizzoni et al. ............. 74/89.36

FOREIGN PATENT DOCUMENTS

| JP | 07231606 | | 2/1994 |
| JP | 10014164 | | 6/1996 |
| JP | 9-222116 | * | 8/1996 |
| JP | 11098760 | | 9/1997 |
| JP | 10-14164 | | 1/1998 |
| JP | 11-98760 | | 4/1999 |

* cited by examiner

SCREW AND NUT TRANSMISSION AND CABLE ATTACHED TO THE SCREW

TECHNOLOGICAL FIELD OF INVENTION

The subject of the invention is a transmission including a screw, a nut, and a longilinear component such as a cable attached to the screw, and the movement of which is controlled by means of the screw, by a conversion of movement between rotation of the nut and translation of the screw.

BACKGROUND

There are many ways of driving motion transmission cables, whether or not wound in a loop but wherein the motor speed should almost always be geared down to increase the force transmitted by the cable. One system encountered includes two pulleys of different diameters on which the cable is wound, possibly making several revolutions around the pulley of smaller diameter in order to increase grip. The small pulley is the driver and communicates a smaller rotation but a more substantial torque to the large pulley. A drawback of this system is that it has a large space requirement, the two pulleys having significant minimum diameters, that slipping is difficult to eliminate completely and that the cable portion on the small pulley is subject to a significant angular speed which increases its fatigue and may therefore cause it to wear quickly.

Another system includes gear reductions, but these mechanical means include substantial play which makes them inaccurate and their space requirement is still significant. In other designs, cable movements are controlled by means of a block gearing down the motion between a drive cable and a driven cable, but blocks are complex pieces of equipment and the reliability of the whole is not guaranteed.

One final group of motion to cable transmissions, to which the invention is related, includes screw and nut systems one of the elements of which is driven by the motor and the other is attached to the cable. These systems achieve excellent speed reduction and good nominal resistance, but a significant problem emerges in that the components have to be guided and that possible alignment defects have to be taken into account between the screw, the nut and the cable.

This latter phenomenon causes significant friction between the screw and the nut and bending moments on the screw, which compromise the yield and lifespan that might have been expected. Mechanisms responsible for guiding the screw and the nut while keeping them in alignment, and which might have overcome these defects, are too cumbersome or increase friction still further. It is for this reason that the proposal has been made (in French patent 2 782 467) to mount the nut on a frame using a cardan joint which allows it to follow the tilting movements of the screw, to which the cable or another connection component is attached, but the cardan joint must surround the nut in such a way that its axes of rotation converge towards the centre of the nut, which gives too voluminous an assembly for many applications. Another cardan joint is moreover provided between the screw and the connection component to which it is attached.

A different means is therefore used to improve the alignment between the transmission component such as the cable, the screw to which this component is attached and the nut, or at least to attenuate the effects of alignment defects.

BRIEF DESCRIPTION OF THE INVENTION

In its most general form, the invention thus relates to a transmission consisting of a longilinear component, a motor, and a screw and nut assembly, where the nut allows the screw to slide, with the nut being driven by the motor and the component being attached to the screw, so as to control the movement of the component by means of the screw via a conversion of movement between a translation of the nut and a rotation of the screw and where a combination of the component and a means of attaching the component with arms is flexible in an angular position relative to the screw; this transmission is characterised in that the screw is bored with an axial cavity and that the attachment means is housed in the cavity.

The attachment means is, preferably, at mid-travel position of the nut on the screw. The result of this design is that the bending moment exerted on the screw between the nut and the transmission component attachment point is proportionate to a short lever arm: it is therefore small.

The cavity and the longilinear component may emerge from the screw through one end or through both, particularly if the component is wound in a loop. The component may be a fully flexible cable, a rigid rod or again a flexible rush. The attachment means may then be rather different. In the case of a flexible part, one setting in the screw will be sufficient. Otherwise a single or dual articulation, or a ball-and-socket joint, will have to be designed in order to allow a variation in the angle between the rod and the screw.

If the transmission component is not rigid under torsion, a means of stopping the pivot rotation of the screw relative to a frame or to another fixed point should normally be provided. This may be a travelling runner pointing in the direction of the screw, or more generally a transverse two-degrees-of-freedom coupling like an Oldham coupling, or any other coupling having the same property.

The longilinear component attachment means may be held in the screw by a spacer engaged in the cavity, against which the attachment means is stopped, and a hollowed-out cap mounted on the screw stopping on the spacer, and which the longilinear transmission component passes through.

The invention will now be described in more detail by means of FIGS. 1, 2, 3, 4, 5, 6, 7, 8, 9, and 10 which all show different embodiments of the invention.

DETAILED DESCRIPTION

Figure 1:
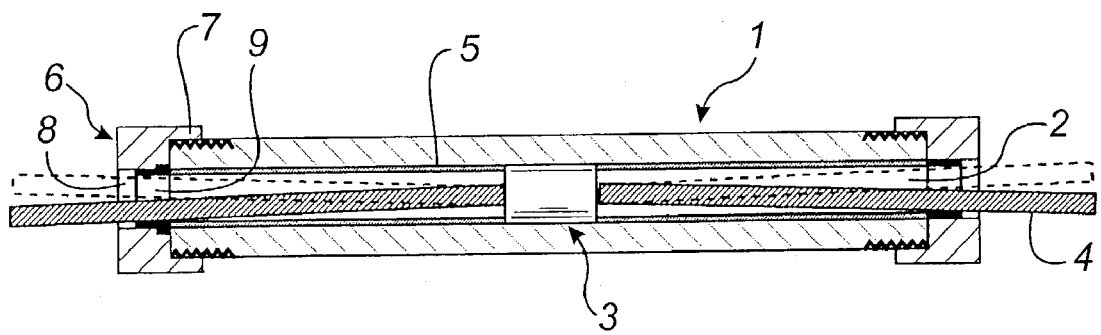
FIG. 1 illustrates a schematic view of a screw in accordance with an embodiment of the invention.

FIG. 1 shows an endless screw 1 passed right through by an axial cavity 2 and in the centre of which is found a setting 3 of a transmission cable 4 which also passes right through the cavity 2 and to which is fixed a drive part not shown. The cable 4 may form an endless loop, particularly in this construction, or a segment. The setting 3 is held, on each side of the cavity 2, by a spacer 5 in the form of a bush which extends between it and one of the apertures of the cavity 2, where it is held by a cap 6 including a nut portion 7 engaged on the last threads of the screw 1, a central aperture 8 for the cable 4 to pass through and a stop part 9 which holds the spacer 5 in place in the cavity 2.

Figure 2:
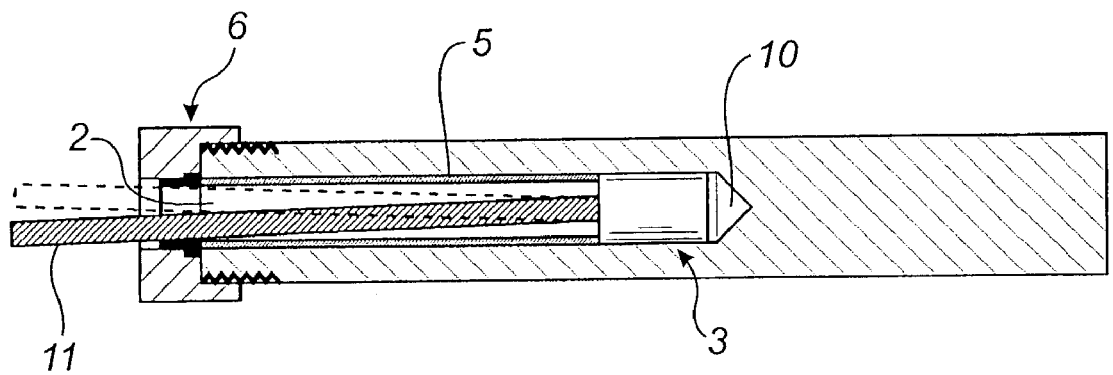
FIG. 2 illustrates a schematic view of a screw having a blind cavity in accordance with an embodiment of the invention.

FIG. 2 shows a similar construction, but one in which the cavity 10 is blind and the setting 3 is supported against the bottom of this cavity. It is then one end of a cable 11 of finite length that is set. A single spacer 5 and cap 6 system is encountered.

Figure 3:
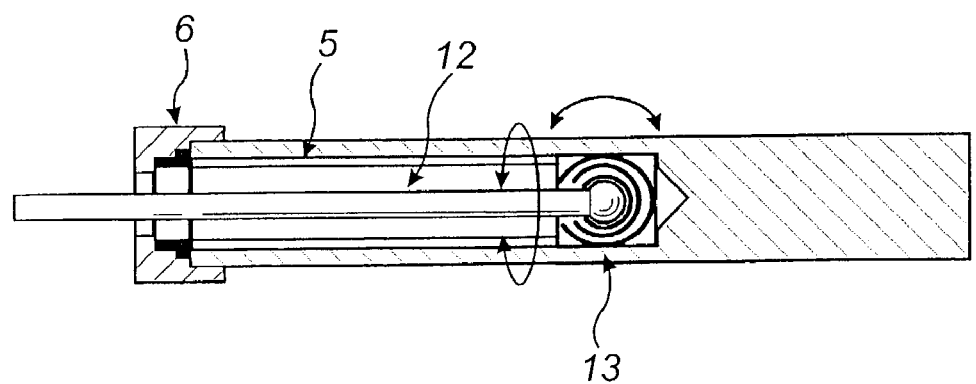
FIG. 3 illustrates a schematic view of a screw having a blind cavity and rigid rod in accordance with an embodiment of the invention.

The invention may be implemented (FIG. 3) with a rigid rod 12 replacing a flexible cable. The setting 3 is then replaced by an articulation, and in particular by a dual articulation or a ball-and-socket joint 13 in which one end of the rod 12 is held. The other aspects of the constructions in FIGS. 1 and 2 remain possible, and furthermore a system with a bush acting as a spacer 5 and a cap 6 acting as a stop is encountered again.

Figure 4:
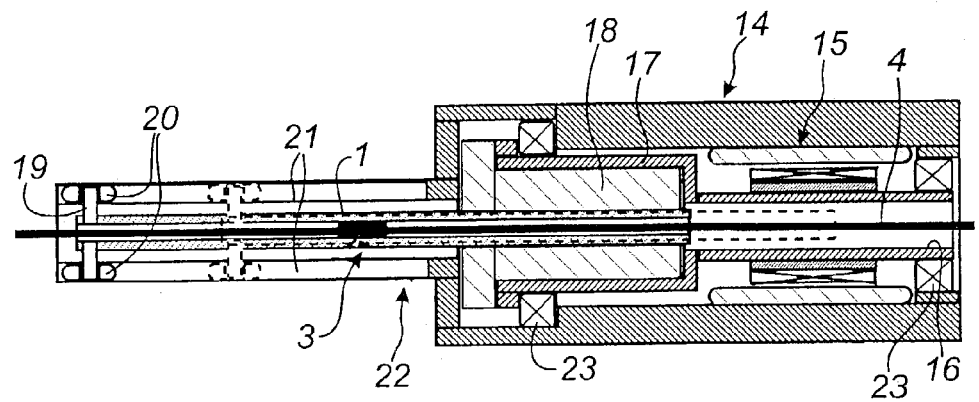
FIG. 4 illustrates a schematic view of a transmission component in accordance with an embodiment of the invention.

A complete transmission is shown in FIG. 4. A frame 14 houses a hollow shaft motor 15 which drives a hub 16 extending out of the motor 15 to form a receptacle 17 for housing a nut 18 driving a screw in accordance with any one of the previous definitions, like the screw 1 in FIG. 1. It is engaged in the nut 18 and, depending on the motion that is imposed on it, may penetrate into the hub 16, which is passed through in any case by one branch of the cable 4. The other end of the screw 1 carries a pin 19 supporting rollers 20 rolling in wide-open grooves 21 of a sleeve 22 belonging to the frame 14. This travelling runner system integral with the screw 1 pits itself against rotations of the screw 1 and therefore allows the nut 18 to slide it along the grooves 21 approximately parallel to the screw 1, while lending itself to small transverse tilting movements of the screw 1 in the fixed sleeve 22 as a function of the traction exerted on the cable 4, thanks to the track and aperture widths of the grooves 21. Finally, the hub 16 is held in the frame 14 by a pair of bearings 23.

The mechanical connection between the screw 1 and the component guiding it, in this case the sleeve 22, must be approximately equivalent to an Oldham coupling, which has the property of absorbing motion in both transverse directions of both the parts it joins together. In the previous embodiment, the rollers 20 may be displaced to one side without leaving the tracks of the grooves 21, and in the other direction by lifting themselves from the tracks. It is not necessary for the rollers 20 to be closely guided in the grooves 21 since they are used above all to pit themselves against the rotation of the screw 1.

Figure 7:
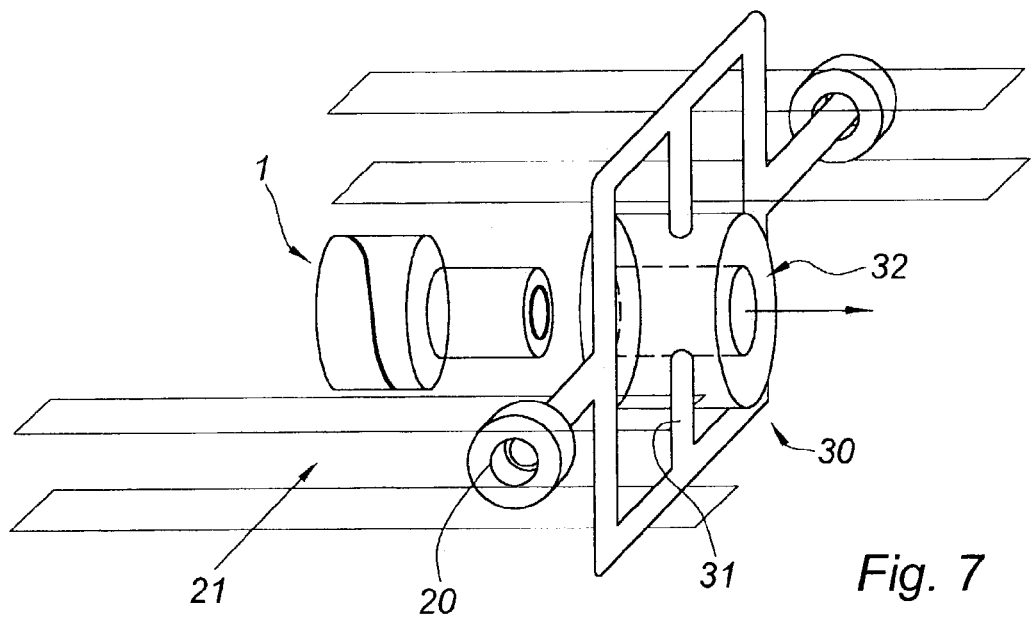
FIG. 7 illustrates a perspective view of a transmission component in accordance with an embodiment of the invention.
Figure 8:
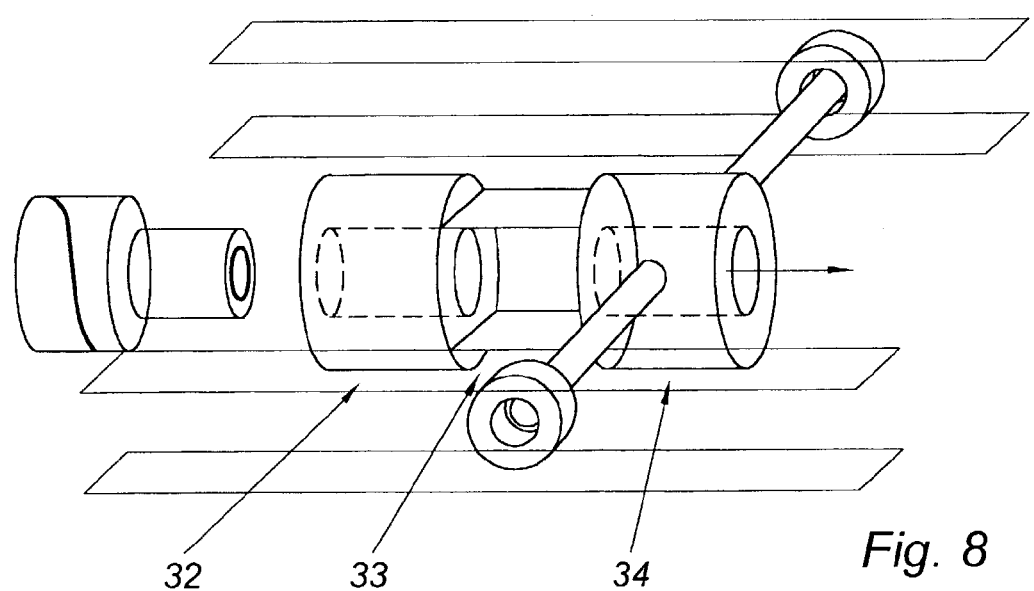
FIG. 8 illustrates a perspective view of a transmission component with a leaf spring in accordance with an embodiment of the invention.
Figure 9:
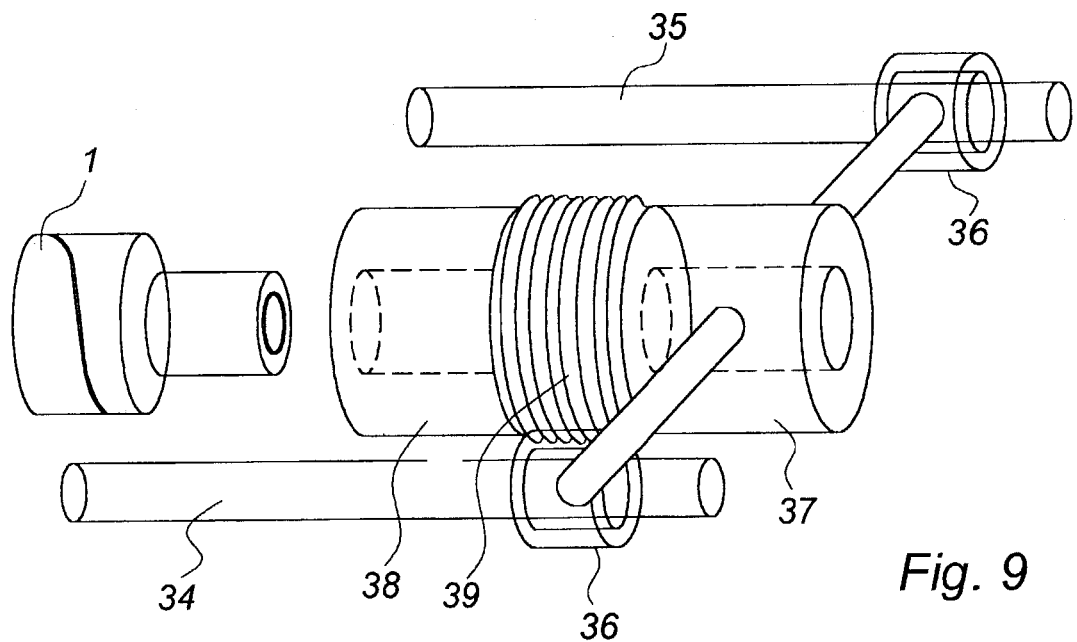
FIG. 9 illustrates a perspective view of a transmission component with a bellows component in accordance with an embodiment of the invention.
Figure 10:
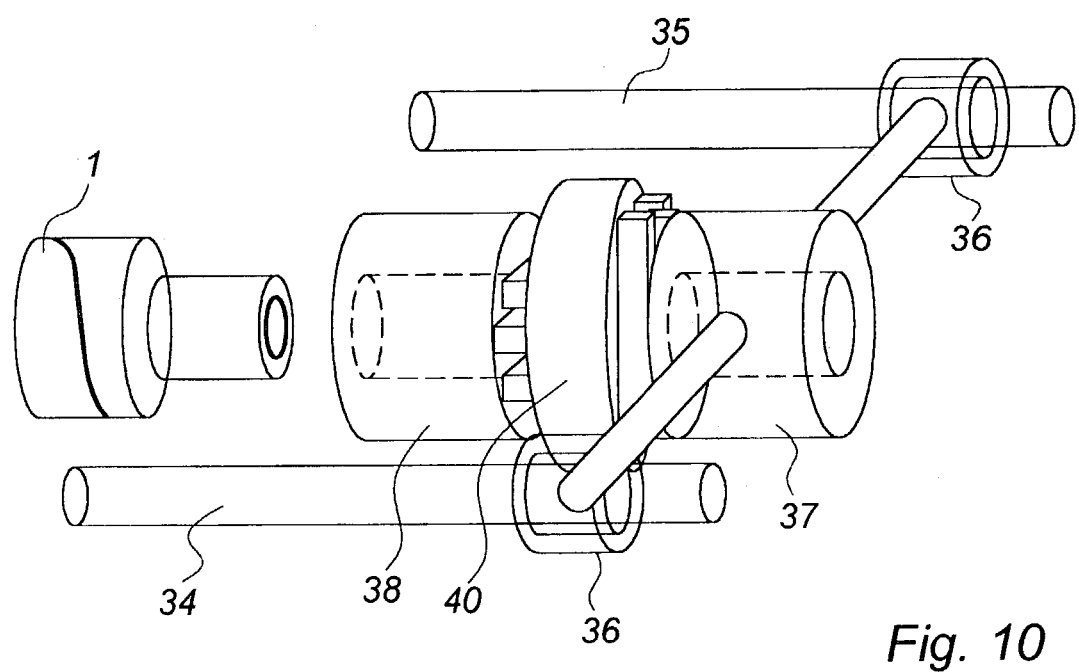
FIG. 10 illustrates a perspective view of a transmission component with an Oldham coupling in accordance with an embodiment of the invention.

If the rollers 20 are however arranged in grooves 21 which are too narrowly open to allow sufficient travel of the screw 1, the necessary flexibility may be restored if the rollers 20 are mounted on a frame 30 equipped with a central slider 31, oriented in the direction of opening of the grooves 21, on which an end piece 32 of the screw 1 slides (FIG. 7), or if a leaf support 33, flexible in the same direction, joins the end piece 32 to a runner 34 carrying rollers 20 (FIG. 8). A bellows could replace the leaf spring 33; the assembly would then be flexible in the width direction of the grooves 21, which would allow them to be replaced and a rigorous guide bush to be used, taking the appearance of sliders 35 parallel to the screw 1 and on which would slide rings 36 connected to a runner 37, which would also be connected to an end piece 38 of the screw 1 either by a bellows 39 (FIG. 9), or by an Oldham coupling 40 (FIG. 10).

It may be seen that the setting 3, located approximately half-way along the screw 1 and therefore approximately at mid-travel, remains at a short distance from the nut 18 even when the screw 1 is in its extreme position: if vertical bending is imposed on it by the cable 4, the force which is exerted between it and the nut 18 remains moderate, which substantially reduces the risks of sticking and bending of the screw 1 and of the friction which might be exerted between it and the nut 18 even without permanent damage. Experiments conducted in the laboratory have demonstrated this, and in particular that the friction measured remained close to the theoretical values of the screw and nut system. One effect of the invention is therefore to make this system effective once again.

Figure 5:
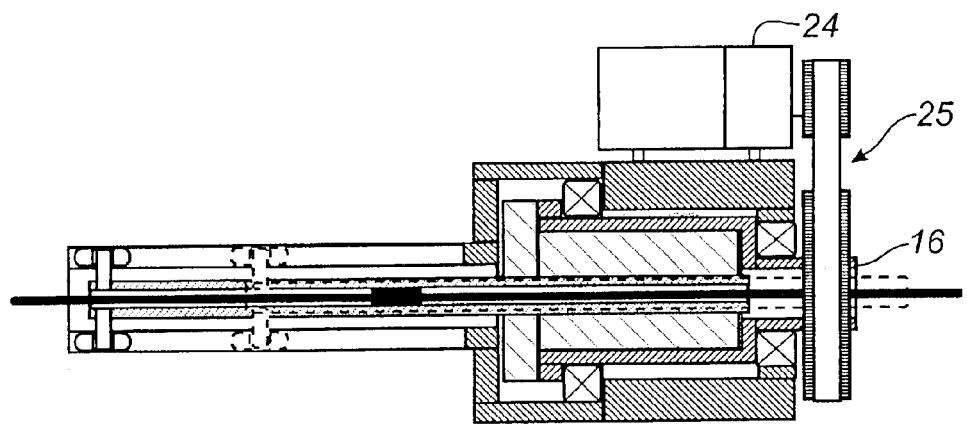
FIG. 5 illustrates a schematic view of a transmission component in accordance with an embodiment of the invention.

FIG. 5 is a similar design, in which the hollow shaft motor 15 is replaced by a motor 24 external to the frame 14 and which drives one end of the hub 16 using a belt drive 25 tensioned between pulleys or the like.

Figure 6:
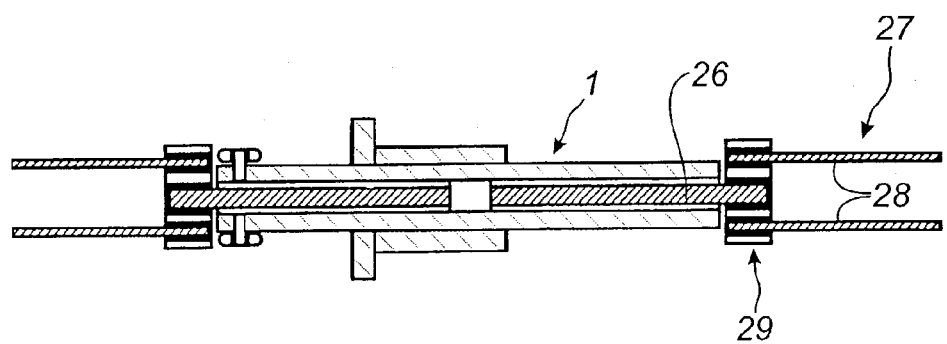
FIG. 6 illustrates a schematic view of a transmission component in accordance with an embodiment of the invention.

FIG. 6 shows a composite transmission component including, within the screw 1, a single portion 26 as a single cable, which is joined to an additional portion 27 of the component which is divided at that point and, composed of a plurality of strands of cables 28 joined to the single portion 26 by a spreader 29. This arrangement may be found on both sides of the screw 1 if necessary. The component may as previously form a loop or not form one.

It is apparent that the invention may be implemented in other ways. In this way the rotation stop component becomes unnecessary when the transmission component is rigid under torsion, unable to pivot and connected to the screw by a connection which is rigid under torsion: in these constructions, stopping the rotation of the screw 80 is brought about by the essential components of the mechanism themselves; in the case of FIG. 3, the bar 12 is rigid under torsion and therefore holds the screw if it is attached to a body which does not rotate and if a dual articulation replaces the ball-and-socket joint 13.

Numerous applications may be proposed for the invention. The transmission component may rotate a body, translate it, or even cause it to pivot or otherwise move. It is already planned to use the invention to regulate the steering of guide wheels, or to act as active suspension to a wheel suspended from a lever made to rotate by the invention, as a complement to conventional cushioning means.

When the transmission component is flexible and has to be tensioned, this may be achieved by a spring, a counterweight or a loop arrangement of the component.

It is obvious that the previous description has not exhausted all the forms the invention may take, and in particular all its possible modes of construction; those which have been discussed could be combined in different ways.

The invention claimed is:

1. A transmission comprising:
   a longilinear component,
   a motor, and
   a screw and nut assembly, where the nut allows the screw to slide, with the nut being driven by the motor and the longilinear component being fastened to the screw by a means for fastening housed in an axial cavity bored in the screw, at least one of the longilinear component and the fastening means being flexible in an angular position relative to the screw, the longilinear component driven by the screw and emerging from the screw through at least one end thereof.

2. A transmission according to claim 1, characterised in that the fastening means is at mid-travel position of the nut on the screw.

3. A transmission according to claim 1, characterised in that the cavity and the longilinear component pass completely through the screw.

4. A transmission according to claim 1, characterised in that the longilinear component is a flexible cable and the fastening means is a setting component.

5. A transmission according to claim 1, characterised in that the longilinear component is a rigid rod and the fastening means includes a dual articulation component.

6. A transmission according to claim 1, characterised in that the longilinear component is rigid under torsion and the screw is free in rotation.

7. A transmission according to claim 1, characterised in that the screw is provided with a rotation stop means relative to a frame.

8. A transmission according to claim 7, characterised in that the rotation stop means includes a travelling runner adjacent to the screw.

9. A transmission according to claim 7, characterised in that the rotation stop means includes a two-degrees-of-freedom coupling for allowing a transverse tilting movement of the screw.

10. A transmission according to claim 9, characterised in that the coupling includes wide and wide-open grooves in which rollers of the runner may move transverse to the screw in both directions, the runner being connected to the screw.

11. A transmission according to claim 9, characterised in that the coupling includes wide grooves in which rollers of the runner may move transverse to the screw in one direction, the runner being connected to the screw by a means for providing flexibility, the means for providing flexibility in one opening direction of the grooves.

12. A transmission according to claim 11, characterised in that the means for providing flexibility is a leaf spring.

13. A transmission according to claim 7, characterised in that the rotation stop means includes sliders on which slides a runner joined to the screw by a coupling flexible in two directions transverse to the screw.

14. A transmission according to claim 1, characterised in that it includes a spacer engaged in the cavity, against which the attachment means stops and a hollowed-out cap, which is mounted on the screw and stops on the spacer, and through which the longilinear component passes.

15. A transmission according to claim 1, characterised in that the longilinear component includes a unitary portion in the screw and a divided portion outside the screw, which is coupled to the unitary portion by a spreader.

16. A transmission tool comprising:
   a screw having a first end and a second end and a bored cavity within along a longitudinal axis therebetween, the screw having an aperture at the first end in communication with the bored cavity;
   a longilinear component positioned in the bored cavity substantially along the longitudinal axis and extending through the aperture at the first end; and
   means for coupling the longilinear component to the screw, the means for coupling positioned within the bored cavity and moveable with respect to the screw along the longitudinal axis, wherein at least a portion of the longilinear component is received in the means for coupling.

17. A transmission tool according to claim 16 wherein the screw further comprises a set of rollers configured to prevent rotation of the screw and allow movement of the screw substantially along the longitudinal axis.

18. A transmission according to claim 16, wherein the screw includes an aperture at the second end in communication with the bored cavity, wherein the longilinear component extends through the aperture at the second end.

19. A transmission comprising:
   a motor;
   a nut driven by the motor;
   a screw configured to be driven by the nut along a longitudinal axis and having a bored cavity within, the screw having an aperture at a first end wherein the aperture is in communication with the bored cavity;
   a longilinear component positioned within the bored cavity and extending substantially along the longitudinal axis, the longilinear component extending through the aperture at the first end; and
   means for coupling the longilinear component to the screw, the means for coupling is housed in the bored cavity and configured to receive at least a portion of the longilinear component.

20. A transmission according to claim 19 wherein the screw further comprises a set of rollers configured to prevent rotation of the screw and allow movement of the screw substantially along the longitudinal axis.

21. A transmission according to claim 19, wherein the screw includes an aperture at the second end in communication with the bored cavity, wherein the longilinear component extends through the aperture at the second end.

* * * * *